Sept. 20, 1966        D. F. WHITE        3,273,865
AERATOR
Filed June 23, 1964

INVENTOR
Douglas F. White
BY Eli Weiss
ATTORNEY

United States Patent Office 3,273,865
Patented Sept. 20, 1966

3,273,865
AERATOR
Douglas F. White, Bedminster, N.J., assignor to American Radiator & Standard Sanitary Corporation, New York, N.Y., a corporation of Delaware
Filed June 23, 1964, Ser. No. 377,350
16 Claims. (Cl. 259—108)

This invention pertains to aerators and more particularly to high-speed disc type aerators.

Aeration is a process wherein water and air are brought into direct contact with each other. It may be used to furnish oxygen to waters which are deficient in this element. One such use is in the treatment of sewage. The sewage is collected in an aeration tank where it is mixed with sludge. The mixture is agitated to bring fresh surfaces in contact with the air so that atmospheric oxygen is supplied to the mixture. The oxygen through the agency of bacteria causes certain changes to occur in the sewage to render it inactive and unoffensive.

At present, such agitation and aeration takes place by introducing compressed air into the mixture or by the use of mechanically actuated paddle wheels. The compressed air systems are usually expensive because it is necessary to furnish a supply of compressed air. On the other hand, the mechanically actuated paddle-wheel systems have their own complications. In such systems, the rotors carrying the paddle-wheel blades are driven at typical speeds of fifty revolutions per minute by a speed reducing gearbox connected to an electric motor. The paddle wheels are usually disposed close to the surface of the liquid and violently churn the surface to entrain the air and also to impart overall circulation to the liquid sewage. Accordingly, there is a constant opposing interaction between the paddle wheels and the fluid. To avoid breakage of the paddle wheels it is necessary to use extremely strong materials. Nevertheless, the wheels are subject to constant wear and have a limited life. Furthermore, such paddle wheels can only be rotated at relatively low speeds and therefore cannot be directly connected to a motor. In addition, control of rate of aeration can only be accomplished by changing the speed of rotation of the paddle wheels. Hence, it is necessary to interpose a gearbox between the rotor of the paddle wheels and the motor.

It is, accordingly, a general object of the invention to provide a more simple and versatile aerator.

It is another object of the invention to provide a longer lived aerator which is not subjected to the usual violent interactions between the fluid to be aerated and the paddle wheels of conventional aerators.

It is a further object of the invention to provide an improved aerator which is easily controllable to operate at different rates of aeration.

Generally, the invention contemplates the aeration of a liquid in a container exposed to the air. The aeration is performed by establishing a vortex in the liquid. The vortex provides a constantly changing interface of air and liquid insuring a highly efficient transfer of air into the liquid. The vortex is established by applying a rotary shear force to the liquid. The rotary shear force is generated by plurality of parallel and axially displaced laminae which are simultaneously rotated about a common axis of rotation in the liquid.

Other objects, as well as the features and advantages of the invention, will be apparent from the following detailed description when read with the accompanying drawings which show, by way of example and not limitation, the now preferred embodiment of the invention.

Figure 1:
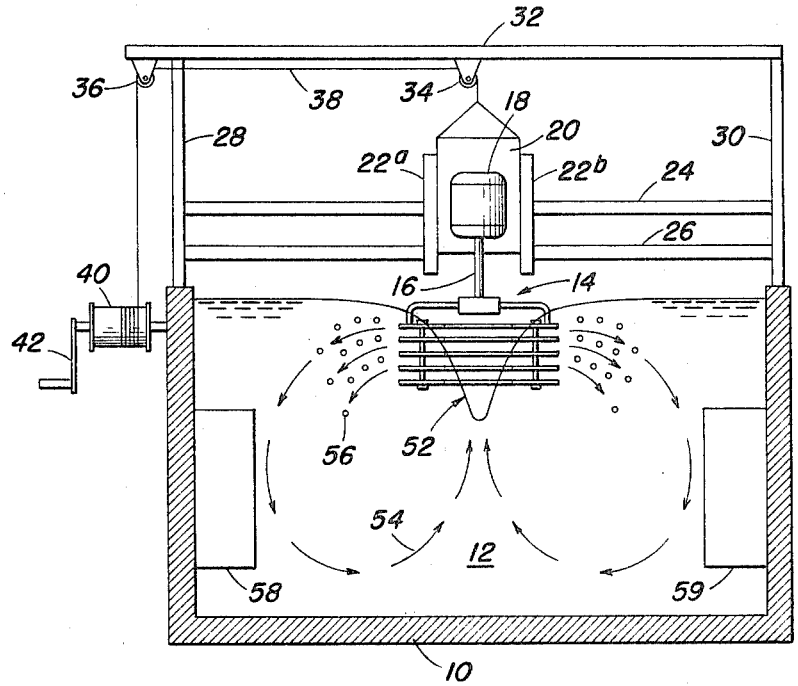
FIG. 1 shows a side view, partially in section of an aerator, in accordance with the invention, operating in a tank of liquid.

Referring now to FIG. 1, there is shown an open container or tank 10 containing a liquid 12 such as sewage which is to be aerated. Positioned in the liquid 12 is the aerator 14 which extends via shaft 16 from motor 18. Motor 18 is a conventional A.C. synchronous motor operating at some desired speeds such as nine, eighteen or thirty-six hundred revolutions per minute. It is to be understood that these speeds are representative only and that they are not critical and that any desirable speed may be used. Motor 18 is fixed to support member 20 which can slide up and down in grooved upright guides 22. Guides 22 are fixed to cross members 24 and 26. Cross members 24 and 26 are supported by uprights 28 and 30 extending upward from the rim of tank 10. Fixed to the top of uprights 28 and 30 is an upper crosspiece 32 having mounted thereon pulleys 34 and 36. A cable 38 connected to support 20 passes over pulleys 34 and 36 to drum 40 rotatably mounted on the side of tank 10. Accordingly, the depth of penetration of aerator 14 into liquid 12 can be controlled by rotating drum 40 by means of handle 42.

Figure 2:
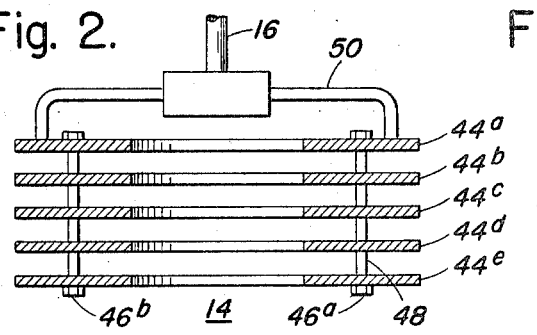
FIGS. 2, 4 and 5 illustrate cross-sectional views of the aerator of FIG. 1 which includes a plurality of planor apertured discs.

By referring to FIG. 2, the details of the aerator 14 will be apparent. In particular, the aerator 14 includes a plurality of laminae or apertured discs 44 (see FIG. 3) which by means of tie rods 46 and spacers which can be of streamlined design such as 48 are maintained in parallel and axially spaced from each other. Fixed to top disc 44a is a spider support 50 for connecting the discs 44 to shaft 16 so that they may be rotated about their common axis of rotation which is colinear with shaft 16.

Figure 4:
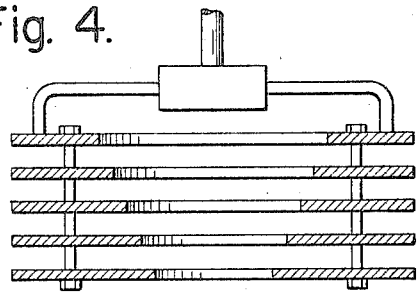
Figure 5:
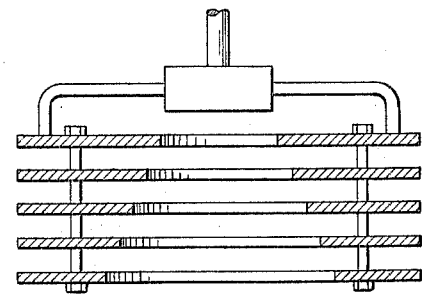

Under certain conditions it may be desirable to provide an aerator having discs of progressively smaller or larger apertures. For example, the radius of the aperture 60 of FIG. 3 will vary with depth of submergence. With reference to FIG. 4, there is illustrated an aerator having a progressively smaller diameter aperture with depth; and FIG. 5 illustrates an aerator having a progressively larger diameter aperture with depth.

Figure 3:
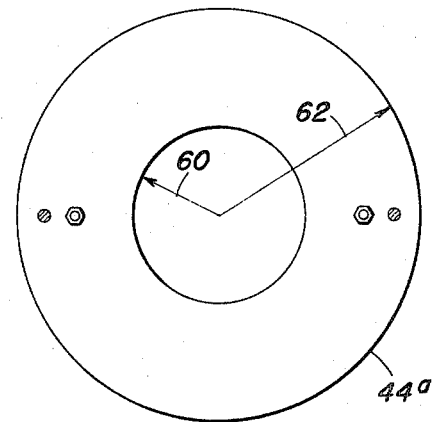
FIG. 3 shows a plan view of one of the discs of FIG. 2.

In operation, aerator 14 is positioned in liquid 12 and motor 18 is energized. Discs 44 are, accordingly, rotated at a high speed. The friction between the planar surfaces of discs 44 and the adjacent fluid imparts a shear force in the latter. The shear force imparts a rotational motion to the fluid in the region of aerator 14. This rotational flow creates a vortex 52 which whirls generally in the region defined by the apertures of discs 44. The vortex 52 establishes a fluid flow indicated generally by the arrows 54 in liquid 12. Accordingly, the interface between the liquid 12 and the atmosphere is constantly changing and air in the form of bubbles 56 is mixed with the liquid. Since the rate of aeration is a function of the size of the vortex 52 and since the vortex size is dependent on the depth of penetration of aerator 14 in liquid 12, it is apparent that by means of the drum, cable and pulley system an operator can control aeration rate in accordance with existing conditions. It should also be noted that fluid circulation can be controlled and enhanced by conventional baffles 58 and 59 extending inward from the walls of tank 10. In addition, the size of the vortex with respect to the tank and the liquid contained therein is initially determined by the magnitude of the inner radius 60 and the outer radius 62 of the discs 44, (FIG. 3).

It should be further noted that although no source of electrical power has been shown for motor 18 a conventional 60 cycle alternating current line can be connected to the motor 18.

There has, accordingly, been shown an improved aerator in the form of a plurality of high speed rotating apertured laminae which efficiently aerates a liquid such as sewage. By use of such laminae a vortex is created in the liquid which establishes a fluid flow therein to provide a continuously changing interface between the liquid and the atmosphere. Furthermore, by virtue of the use of only shear forces between the surfaces of the laminae and the liquid, the operation is not accompanied by the usual violent interaction between the liquid and the impeller which occurs when paddle wheels are employed to agitate the liquid.

While only one embodiment of the invention has been shown and described in detail there will now be obvious to those skilled in the art many modifications and variations which satisfy many or all of the objects of the invention but which do not depart from its spirit as defined by the appended claims.

What is claimed is:

1. An aerator for aerating a liquid in a container exposed to the air comprising a plurality of apertured laminae having surface portions, spider means connected to at least one of the outermost apertured laminae, means for connecting each one of the remaining laminae to said outermost apertured lamina whereby said laminae are supported in parallel, axially-spaced and aligned relationship so that the apertures of said laminae define a central unobstructed cylindrical open-ended cavity, and means for rotating said spider means and thereby said laminae about a common axis of rotation at high speed so that a shear force is exerted on the liquid between the surface portions of said laminae to establish a vortex of liquid in the region defined by the apertures of said laminae, said vortex providing a constantly changing interface of air and liquid.

2. The combination of claim 1 wherein the apertures in said apertured laminae are of equal diameter.

3. The combination of claim 1 wherein the apertures in said apertured laminae are progressively smaller with depth of submergence.

4. The combination of claim 1 wherein the aperture in said apertured laminae are progressively larger with depth of submergence.

5. An aerator system for aerating a liquid comprising a container including side walls and an open top for exposing the liquid to air, a plurality of baffles extending from said side walls into the liquid, a plurality of apertured flat discs having surface portions, means for supporting said flat discs in parallel and axially spaced relationship, and means for rotating said flat discs about a common axis of rotation at high speed so that a shear force is exerted on the liquid between the surface portions of said flat discs to establish a vortex of liquid in the region defined by the apertures of said flat discs, said vortex providing a constantly changing interface of air and liquid.

6. An aerator system for aerating a liquid comprising a container including side walls and an open top for exposing the liquid to air, a plurality of baffles extending from said side walls into the liquid, a plurality of apertured flat discs having surface portions, means for supporting said flat discs in parallel and axially spaced relationship, means for controlling the depth of penetration of said flat discs into said liquid, and means for rotating said flat discs about a common axis of rotation at high speed so that a shear force is exerted on the liquid between the surface portions of said flat discs to establish a vortex of liquid in the region defined by the apertures of said flat discs, said vortex providing a constantly changing interface of air and liquid.

7. An aeration system comprising a tank of liquid exposed to air, said tank including side walls, a support means extending over said tank, a motor on said support means, a plurality of flat apertured discs including surface portions, spider means connected to at least one of the outermost apertured discs, means for connecting each one of the remaining discs to said outermost apertured disc whereby said discs are supported in parallel, axially-spaced and aligned relationship so that the apertures of said discs define a central unobstructed cylindrical open-ended cavity, and means for connecting said spider means to said motor so that said flat apertured discs are rotatable about a common axis of rotation, said connecting means having a length such that said motor is above said liquid and said flat apertured discs are in said liquid, said motor rotatable at high speed so that a shear force is exerted on the liquid between the surface portions of said flat apertured discs to establish a vortex of liquid in the region of liquid defined by the apertures of said flat apertured discs, said vortex providing a constantly changing interface of air and liquid and causing circulation of the liquid in said container.

8. The aeration system of claim 7 further comprising means for controlling the depth of penetration of said flat apertured discs into said liquid.

9. The aeration system of claim 7 further comprising baffles extending in said liquid from the side walls of said container.

10. The aeration system of claim 7 wherein the apertures in said plurality of flat apertured discs are of equal diameter.

11. The aeration system of claim 7 wherein the apertures in said plurality of flat apertured discs are progressively smaller with depth of submergence.

12. The aeration system of claim 7 wherein the apertures in said plurality of flat apertured discs are progressively larger with depth of submergence.

13. An aerator for aerating a liquid in a container exposed to the air comprising a plurality of apertured laminae having surface portions, means for supporting said laminae in parallel and axially-spaced relationship, the apertures in said apertured laminae being progressively larger with depth of submergence, and means for rotating said laminae about a common axis of rotation at high speed so that a shear force is exerted on the liquid between the surface portions of said laminae to establish a vortex of liquid in the region defined by the apertures of said laminae, said vortex providing a constantly changing interface of air and liquid.

14. An aeration system comprising a tank of liquid exposed to air, said tank including side walls, a support means extending over said tank, a motor on said support means, a plurality of flat apertured discs including surface portions, means for fixing said flat apertured discs in parallel and axially-spaced relationship, means for connecting said fixing means to said motor so that said flat apertured discs are rotatable about a common axis of rotation, said connecting means having a length such that said motor is above said liquid and said flat apertured discs are in said liquid, said motor rotatable at high speed so that a shear force is exerted on the liquid between the surface portions of said flat apertured discs to establish a vortex of liquid in the region of liquid defined by the apertures of said flat apertured discs, said vortex providing a constantly changing interface of air and liquid and causing circulation of the liquid in said container and means for controlling the depth of penetration of said flat apertured discs into said liquid.

15. An aeration system comprising a tank of liquid exposed to air, said tank including side walls, a support means extending over said tank, a motor on said support means, a plurality of flat apertured discs including surface portions, means for fixing said flat apertured discs in parallel and axially-spaced relationship, means for connecting said fixing means to said motor so that said flat apertured discs are rotatable about a common axis of rotation, said connecting means having a length such that said motor is above said liquid and said flat apertured discs are in said liquid, said motor rotatable at high speed so that a shear force is exerted on the liquid between the surface portions of said flat apertures discs to establish a vortex of liquid in the region of liquid defined by the apertures of said flat apertured discs, said vortex providing a constantly changing interface of air and liquid and causing circulation of the liquid in said container, and baffles extending in said liquid from the side walls of said container.

16. An aeration system comprising a tank of liquid exposed to air, said tank including side walls, a support means extending over said tank, a motor on said support means, a plurality of flat apertured discs including surface portions, means for fixing said flat apertured discs in parallel and axially-spaced relationship, and means for connecting said fixing means to said motor so that said flat apertured discs are rotatable about a common axis of rotation, said connecting means having a length such that said motor is above said liquid and said flat apertured discs are in said liquid, the apertures in said plurality of flat apertured discs being progressively larger with depth of submergence, said motor rotatable at high speed so that a shear force is exerted on the liquid between the surface portions of said flat apertured discs to establish a vortex of liquid in the region of liquid defined by the apertures of said flat apertured discs, said vortex providing a constantly changing interface of air and liquid and causing circulation of the liquid in said container.

References Cited by the Examiner

UNITED STATES PATENTS

| 1,477,203 | 12/1923 | McKillican | 259—96 |
| 2,577,802 | 12/1951 | Payne | 259—108 |
| 2,626,135 | 1/1953 | Serner | 261—84 |
| 3,208,734 | 9/1965 | Wood et al. | 261—91 |

WALTER A. SCHEEL, *Primary Examiner.*

WILLIAM I. PRICE, R. W. JENKINS,
*Assistant Examiners.*